Nov. 11, 1952     E. F. LEEFELDT     2,617,125
BED SPRING LEG
Filed Aug. 24, 1949
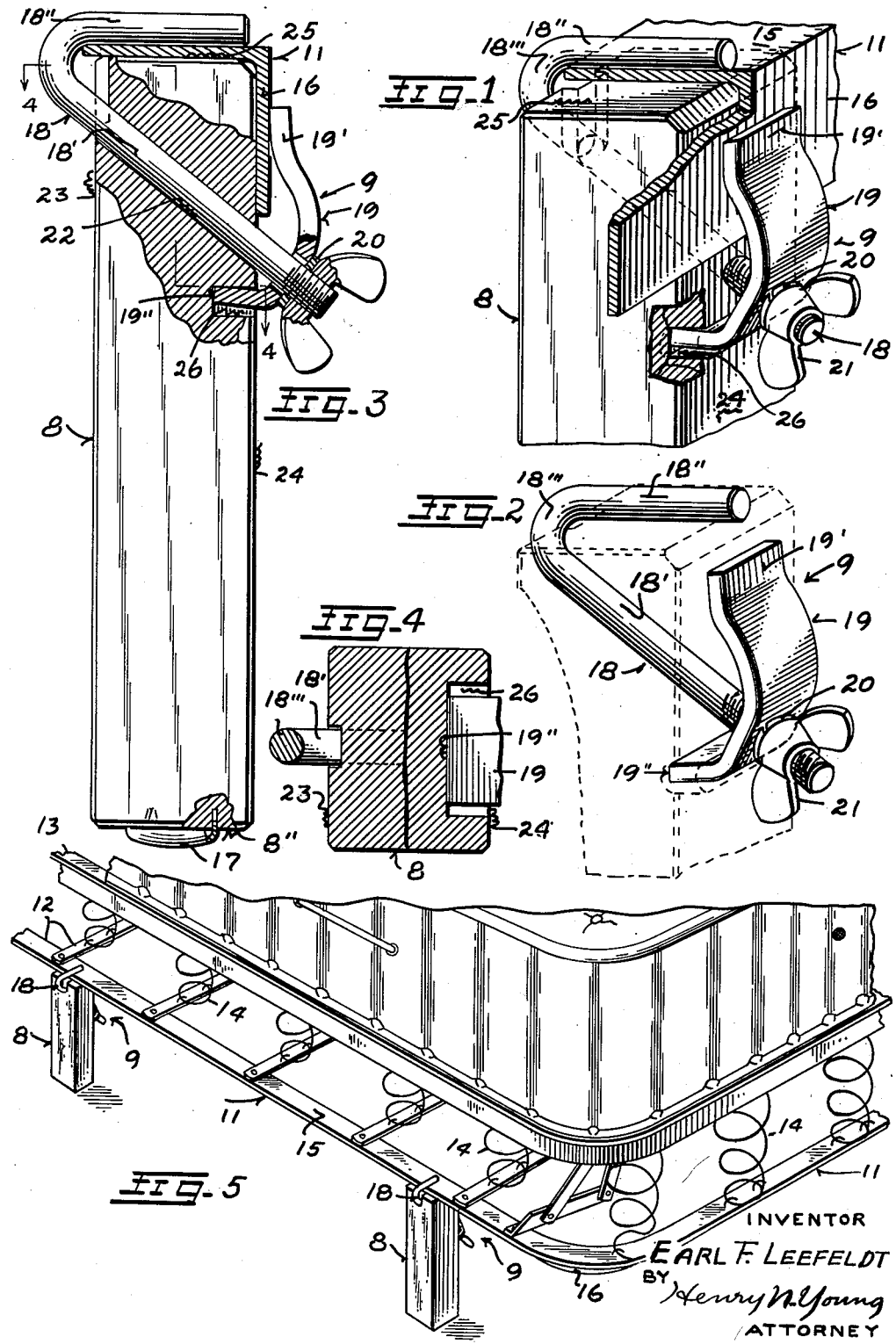
INVENTOR
EARL F. LEEFELDT
BY Henry N. Young
ATTORNEY Patented Nov. 11, 1952

2,617,125

UNITED STATES PATENT OFFICE 2,617,125

BED SPRING LEG

Earl F. Leefeldt, Alameda, Calif.

Application August 24, 1949, Serial No. 111,993

4 Claims. (Cl. 5—310)

The invention relates generally to support legs for direct attachment to horizontally disposed elements of angle section, and more specifically relates to a means for fastening such support legs to a bed-spring assembly for supporting the same in elevated position as a couch or bed.

A general object is to provide for a particularly ready and rigid mounting of a support leg on a horizontally disposed member of angle section in transverse relation thereto.

Another object is to provide for the attachment of a support leg in an adjusted position along an angle member to be supported without requiring alterations in, or additions to the member.

An added object is to provide a particularly simple and effective device for operatively clamping support legs to a metallic bed-spring frame.

A more specific object is to provide an improved direct attachment of a leg member to and beneath a bed-spring frame member of angle section having one flange perpendicular to the leg and the other flange disposed opposite a side of the leg.

The invention possesses other objects or features of advantage, some of which, with the foregoing, will be set forth or be apparent in the following description of a typical embodiment thereof, and in the accompanying drawings in which, Figure 1 is a fragmentary perspective view showing a support leg fixed to a supported element of angle section by the clamp device.

Figure 2 is a perspective view of the clamp device having its parts related as in Figure 1.

Figure 3 is a partly sectional elevation of the assembly of Figure 1.

Figure 4 is a stepped plan section taken at the line 4—4 in Figure 3.

Figure 5 is a fragmentary perspective view showing legs mounted on the under-frame of a bed-spring assembly.

The device of my invention has been particularly designed for the attachment of a leg to the bottom frame of a bed-spring assembly in which an upper frame is supported from a lower frame by coil springs, the periphery of the bottom frame being defined by an angle iron having the different flanges thereof horizontal and upright. As particularly illustrated in Figure 5, legs 8 are shown as supportingly attached by means of a special clamp assembly 9 of present invention to an angle iron 11 comprising the peripheral element of a lower frame 12 which supports an upper frame 13 on a plurality of coil springs 14 in a usual arrangement to provide the unitary bed-spring assembly; in the present structure, the angle iron element 11 has its horizontal flange 15 extending outwardly from the top of its upright flange 16.

The leg 8 is of elongated rectangular outline, and has its upper end portion arranged for fitted engagement within the element 11 for a flat seated engagement of its top end beneath the frame flange 15 while a side of the leg is disposed in parallel opposition to the flange 16. A present leg is assumed to comprise a rectangular block of wood, or other suitable material, which is solid at its top portion where the clamp assembly 9 is operative. The lower leg end 8'' mounts a suitable floor-engaging foot member such as the glider 17 particularly shown.

It will now be noted that the clamp assembly 9 comprises a bolt element 18 of generally J-bolt form, a clamp plate 19 intermediately receiving the bolt shank 18' transversely therethrough, a spring washer 20 on the bolt shank, and a nut 21 threadedly engaging the free end portion of the bolt shank beyond the washer. The bolt head 18'' is generally straight, makes an acute angle with the shank 18', and is integrally joined to the shank at a bend 18'''; in the present instance, the angle defined by the head 18'' with the shank 18' is approximately 40 degrees. The present bolt element 18 is shown as having been formed of a length of round rod of uniform size therealong.

A hole 22 is provided diagonally through the top portion of the leg 8, said hole extending between the faces 23 and 24 of opposite leg sides and being arranged to slidably receive therethrough the bolt shank 18', while the bolt head 18'' extends in parallel relation to the upper end face 25 of the leg, it being understood that the bolt bend 18''' then extends outwardly of the corner defined by the leg faces 23 and 25. When the upper leg end is seated within the V trough space defined by the flanges 15 and 16 of the element 11, the shank-receiving hole 22 is disposed outwardly of, and more or less parallel to, the common plane of the free edges of the flanges to dispose the inserted bolt shank clear of the flange edges while the bolt head 18'' extends operatively across the outer face of the flange 15; this relation is important for assuring the positive clamping of the leg to the element 11, and also provides for usual variations in the dimensions of base frame angle elements of bed-spring assemblies.

The present clamp plate 19 is intermediately arched in such a manner as to provide an end portion 19' for the flat engagement of a side thereof against the opposed flange 16 of an engaged angle iron while the other end portion is arranged to have its end face 19" abut the leg face 24 in generally perpendicular relation thereto. The bolt-receiving hole of the clamp plate 19 is provided transversely through the arched portion of the plate, and is arranged for its substantially coaxial alignment with the leg hole 22 when the extremities of the plate respectively engage the flange 16 and a point of the leg 8 below said flange. The nut 21 is conveniently of wing-nut form to facilitate a mounting or dismounting of a leg.

As particularly shown, a relatively shallow rectangular socket 26 extends into the leg from its face 24 to receive the leg-engaging end of the clamp plate 19 as a positioning means therefor. The leg 8 may be recessed inwardly from its face 23 and above the hole 22 to insure a full operative application of the bolt head 18" to clamp the flange 15 against the upper leg end 8'. It will be noted that as the nut 21 is turned up on the shank 18' against the washer 20 and the plate 19, the bolt head 18" and clamp plate 19 are cooperative to fittedly draw the upper leg portion above the bolt shank into the space within the angle iron 11 to clamp it therein against the flanges and so provide a particularly rigid attachment of the otherwise unbraced leg to the angle iron. While such is not shown, it will be understood that the upper leg portion might be of hollow metallic structure for its attachment by means of a present clamp bolt asembly.

From the foregoing description taken in connection with the accompanying drawings, the advantages of the present bed-spring leg will be readily understood by those skilled in the art to which the invention appertains. While I have described the principle of operation, together with a form of my invention which I now consider to comprise a preferred embodiment thereof, I desire to have it understood that the showing is primarily illustrative, and that such changes and developments may be made, when desired, as fall within the scope of the following claims.

I claim:

1. In combination with an element of angle section, a rectangular leg member having an end and a side disposed against the inside faces of the different flanges of the element, a clamp bolt having its shank portion extending diagonally through the leg member in a line outwardly of the common plane of the free flange edges and having a head portion bearing transversely against the outer face of one flange, a clamp plate slidably mounted on the bolt shank and bearing transversely against the outer face of the other flange, and a nut member on the bolt effecting and maintaining a clamped engagement of the leg against the inner flange faces.

2. In combination with an element of angle section, a leg member having an end face abutting the inside face of a flange of the element, a J-bolt engaged diagonally through the leg and having its head disposed opposite the outside face of said flange in parallel relation thereto, an elongated clamp plate receiving the bolt shank intermediately therethrough and having the different ends thereof respectively engaging the outer face of the other flange of the element and the leg, and a nut on said bolt shank outwardly of the clamp plate and tightened thereagainst to render the bolt operative to clampedly fix the engaged leg end against the inner flange faces.

3. In combination with an element of uniform angle section, a leg member extending transversely from the element and having a rectangular end portion thereof fittedly engaged within the element, a J-bolt engaged diagonally through the leg end portion in a line outwardly of the plane of the flanges of the element and having its head bearing transversely against one said flange of the element, an elongated clamp plate intermediately receiving the bolt shank therethrough and having its opposite ends respectively bearing against the other said flange of the element and the leg side engaged by the flange, and a nut on said bolt shank engaging the outer face of the clamp plate for clampedly fixing the engaged leg portion against the inner flange faces.

4. In combination with an element of angle section, a leg member extending transversely from the element and having a rectangular end portion thereof fittedly engaged within the element, a bolt engaged diagonally through the leg end portion in a line outwardly of the plane of the free edges of the flanges of the element and having a head bearing transversely against one said flange of the element, a clamp plate receiving the bolt shank therethrough and bearing against the other said flange of the element and the leg side engaged by the flange at opposite sides of the shank, and a nut on said bolt shank engaging the outer face of the clamp plate for clampedly fixing the engaged leg portion against the inner flange faces.

EARL F. LEEFELDT.

REFERENCES CITED

The following references are of record in the file of this patent:

UNITED STATES PATENTS

| Number | Name | Date |
| --- | --- | --- |
| 2,466,494 | Slagle | Apr. 5, 1949 |
| 2,476,605 | Jacob | July 19, 1949 |
| 2,484,969 | Stacy | Oct. 18, 1949 |